April 8, 1958 R. MacDOUGALL 2,829,872
DRINK MIXER
Filed March 14, 1955 3 Sheets-Sheet 1

INVENTOR.
Robert MacDougall
BY
Mason, Kolehmainen, Rathburn & Wyss
ATTORNEYS

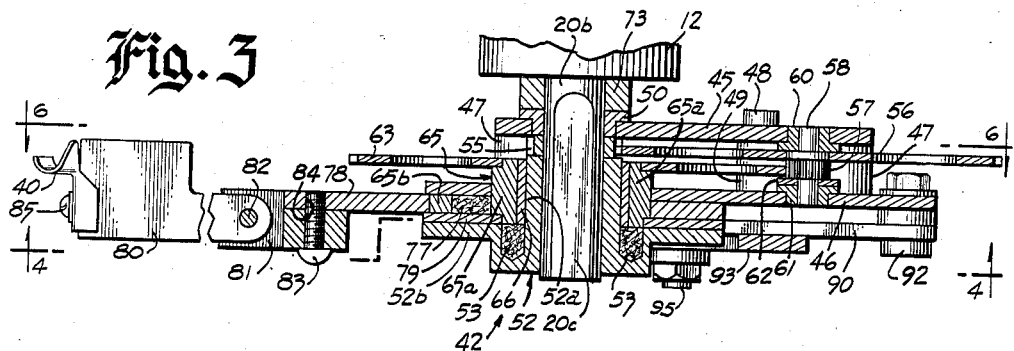
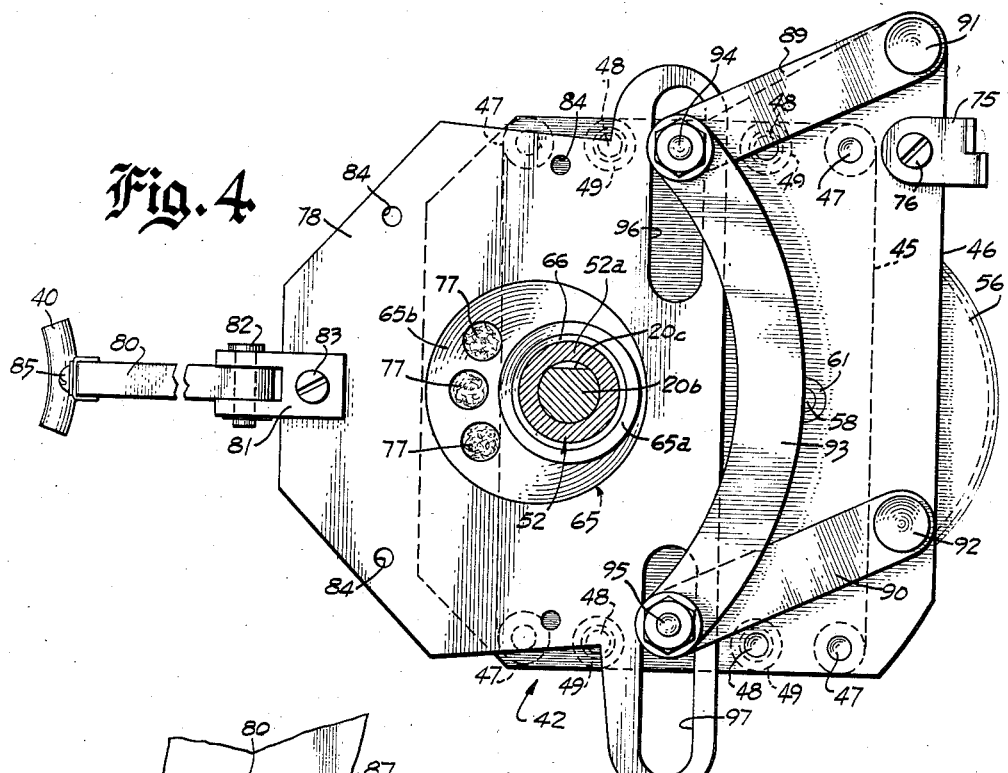

April 8, 1958     R. MacDOUGALL     2,829,872
DRINK MIXER
Filed March 14, 1955     3 Sheets-Sheet 3
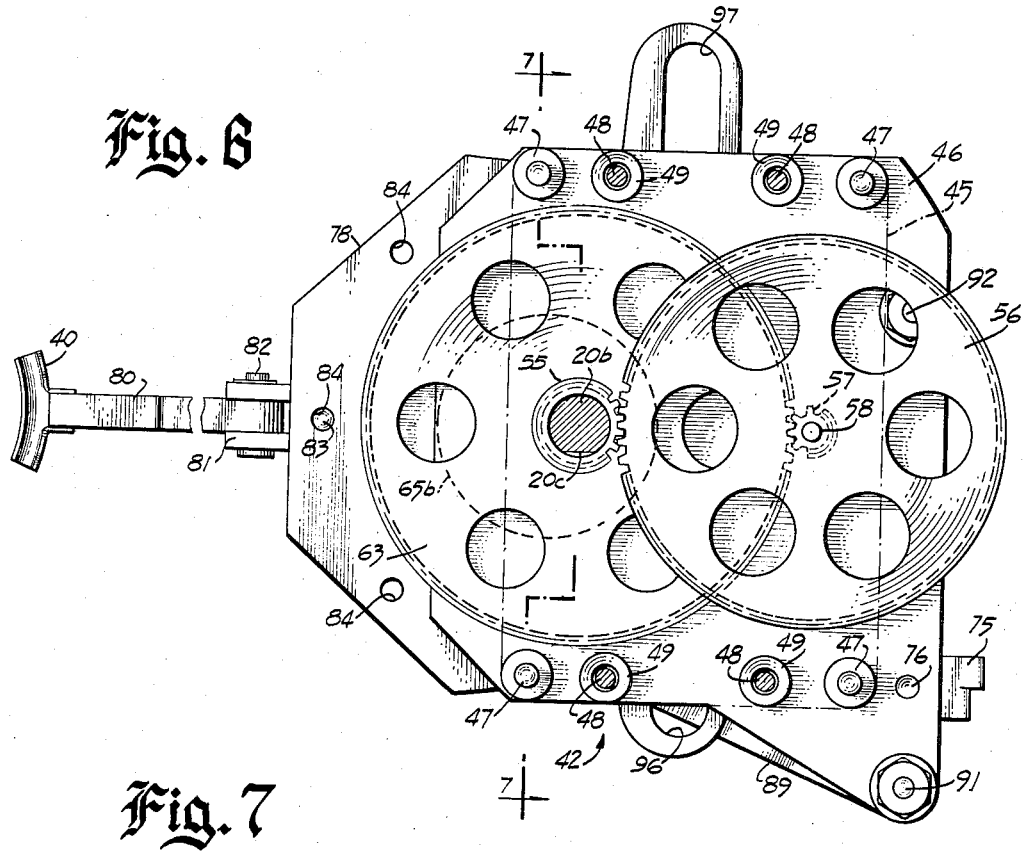
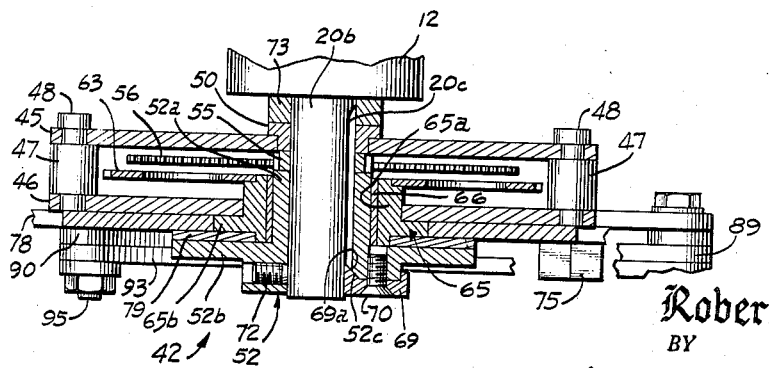
INVENTOR.
Robert MacDougall
BY
ATTORNEYS

United States Patent Office 2,829,872
Patented Apr. 8, 1958

2,829,872
DRINK MIXER

Robert MacDougall, Rock Falls, Ill., assignor to Prince Castle Mfg. Division, Inc., Sterling, Ill., a corporation of Illinois Application March 14, 1955, Serial No. 493,850

13 Claims. (Cl. 259—78)

The present invention relates to a drink mixer, and more particularly to a cup rest moving mechanism carried by and driven by the shaft of a mixer motor. In a specific embodiment this mechanism may be carried by the shaft of a motor which is adapted to drive a plurality of mixer spindles.

It is well recognized that present drink mixers, provided with rotary spindles, mix the contents of a mixing cup or container by rotating spindle blades, which blades have various configurations and dimensions depending into such cup or container. Since the spindle mixing blades are the sole means for agitating the contents of the mixing cup the portion of the contents immediately contiguous to the mixing blades is thoroughly mixed and remixed while the portion of the contents farthest removed from the spindle blades may not be mixed at all or at most only ineffectively mixed. As a result of this, not infrequently the contents of a mixing cup or container are inadequately mixed, thereby producing an unsatisfactory product.

In those mixers which use a base support for positioning the mixing container relative to the mixer, an attempt has been made to reciprocate or agitate the base by a complex drive mechanism in order to increase the efficiency of the mixing operation of the mixer. Various cumbersome devices have been marketed which incorporate several drive shafts or several drive mechanisms to drive a mixer unit and to agitate a container. On the other hand, several types of mixers have attempted to increase the agitation of the contents of the cup by automatically moving the cup longitudinally of the mixing spindles during the mixing operation. Structures of this type likewise require complicated mechanical devices for propelling the mixing cup throughout its cycle. In the drink mixers adapted for fountain use it is not uncommon to provide a larger number of spindles to accommodate the high volume of sporadic trade. Since the fountain mixer is conventionally equipped with a small cup rest for supporting the mixing cup during the mixing operation, it would be desirable to adapt the cup rest as a cup agitator for moving the mixing cup. Likewise, it would be desirable to provide a simple cup rest moving mechanism for moving the mixing cup, which mechanism is adapted to be carried by and driven by the shaft of the motor driving the mixing spindle, thereby providing a simple, compact and relatively inexpensive construction. Furthermore, it would be highly advantageous to provide a drink mixer cup rest moving mechanism for a multiple mixer unit wherein a single motor drives a plurality of mixing spindles and a cup rest moving means which is adapted to be carried by the motor for imparting motion to a plurality of cup supports.

Accordingly, it is an object of the present invention to provide an improved drink mixer cup rest moving mechanism having the desirable characteristics cited above.

It is still another object of the present invention to provide a drink mixer having a cup rest moving mechanism which is adapted to be driven by and carried by a shaft of a drink mixer motor also employed to drive a mixing spindle.

Another object of the present invention is to provide a drink mixer cup rest moving mechanism which is carried by and driven by a shaft of a drink mixer motor and which imparts motion to the cup rest of the drink mixer.

It is a further object of the present invention to provide a drink mixer comprising a drink mixer motor having a shaft protruding from both ends of the motor housing wherein a spindle is drivingly interconnected to one end of the shaft and a cup rest moving mechanism is carried by and driven by the other end thereof.

It is a still further object of the present invention to provide a drink mixer cup rest moving mechanism which is simple and compact, and inexpensive to manufacture.

Further objects and advantages of the present invention will become apparent as the following description proceeds and the features of novelty which characterize the invention will be pointed out with particularity in the claims annexed to and forming a part of this application.

For a better understanding of the present invention, reference may be had to the accompanying drawings in which:

Fig. 3 is an enlarged fragmentary view, partly in section, of the lower portion of the mixer motor of Fig. 1 showing the cup rest moving mechanism of the present invention;

Fig. 4 is a view taken substantially along line 4—4 of Fig. 3 assuming that Fig. 3 shows the complete structure and, for simplifying the drawings, showing only one cup rest;

Fig. 5 is a fragmentary elevational view taken along line 5—5 of Fig. 2;

Fig. 6 is a sectional view taken along line 6—6 of Fig. 3, assuming that Fig. 3 shows the complete structure; and Fig. 7 is a fragmentary sectional view taken along line 7—7 of Fig. 6, assuming that Fig. 6 shows the complete structure.

Briefly, the present invention comprises a cup rest moving mechanism for a drink mixer adapted to be carried by and driven by the shaft of a mixer motor. The mixer motor having a shaft protruding from both ends of its housing drives with one end of this shaft one or more mixing spindles and on the other end thereof supports and drives a cup rest moving mechanism. The cup rest moving mechanism includes means supported from the motor shaft including a gear reduction mechanism to convert rotation of the motor to a slow speed rotary motion. It also includes an eccentric mechanism comprising an eccentric plate and eccentric driven by the gear reduction mechanism for imparting motion to a cup rest or to a plurality of cup rests where the mixing device includes more than one mixing spindle.

Figure 2:
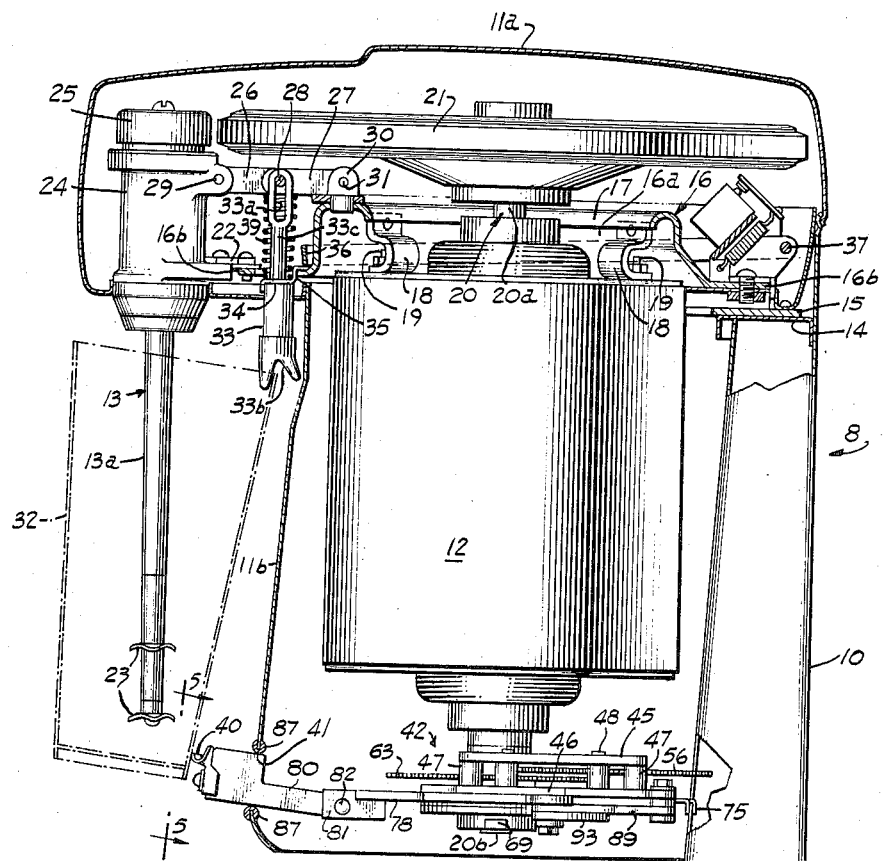
Fig. 2 is an enlarged side elevational view of the mixer of Fig. 1 with certain portions thereof broken away.
Figure 1:
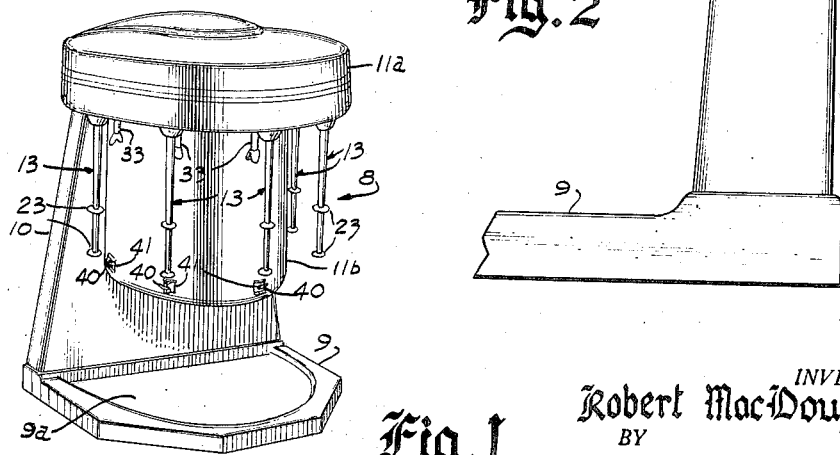
Fig. 1 is a perspective view of a drink mixer embodying the present invention.

Referring now to the drawings, there is illustrated in Figs. 1 and 2 a drink mixing machine, designated generally by the reference numeral 8, embodying the features of the present invention. Although the present invention is applicable to any drink mixing device, it is illustrated by way of example as applied to a multiple drink mixing device of the type disclosed and claimed in Prince et al. Patent 2,531,989, granted November 28, 1950, and assigned to the same assignee as the present invention. As shown, this drink mixing machine comprises a stationary base indicated generally at 9 which includes a depressed portion and a surrounding upstanding rim so as to provide a shallow drip tray 9a. This base member 9 is preferably a stamping of stainless steel, although it might comprise a stamping or casting of any suitable metal. At the rear of the base 9 there is provided an upstanding column or back stand, generally designated by the reference numeral 10, which is secured in any suitable manner to the base member 9. This back stand 10 is illustrated as somewhat in the form of a truncated pyramid, but obviously any other configuration may be employed. A mixing head is supported by the column 10 which includes cooperating housing portions 11a and 11b for enclosing a mixer motor 12. The motor 12 is capable of being drivingly connected to one or more of a plurality of spindle assemblies 13 suitably supported from the mixing head, which in turn is supported by the column 10.

The manner of supporting the motor 12 and the plurality of mixing spindle assemblies 13 from the back stand 10 forms no part of the present invention. Preferably the construction disclosed and claimed in copending Brown et al. application, Serial No. 411,701, filed February 23, 1954, now Patent No. 2,774,579, dated December 18, 1956, and assigned to the same assignee as the instant application, is employed. Briefly, there is supported on the column 10 a cross member 14 and a reinforcing member 15.

To secure the motor 12 and the spindle assemblies 13 to members 14 and 15, there is provided a motor supporting spider, generally designated by the reference numeral 16, preferably comprising a one-piece stamping having a sort of dish-shaped central portion 16a which is disposed in an inverted position and from which the major portion of the bottom of the dish has been removed so as to define a large central opening 17. Integrally associated with the lowermost portion of the inverted dish-shaped central section 16a of the spider 16 is an annular flange 16b which adjacent the column 10 is secured to the members 14 and 15 and, hence, supported as a sort of cantilever beam from column 10. The flange 16b is provided with means to which one or more of the spindle assemblies 13 may be attached. As disclosed in the aforesaid Brown et al. copending application, any type of motor which can be accommodated in the aperture 17 can be supported from the spider 16 in a simple manner. To this end there is secured by suitable means to the inside vertical wall of the dish-shaped central portion 16a a plurality of motor mounting lugs 18 for securing the same to suitable stator bolts such as 19 commonly provided on a motor such as 12.

More specifically, as shown in Fig. 2 of the drawings, the mixer motor 12, supported from its upper end by the spider 16, comprises a motor shaft 20 having its upper end 20a extending above the spider 16 and its lower end 20b depending beneath the motor housing. Secured to the upper extending portion 20a of the shaft 20 for rotation therewith is a spindle driving mechanism which comprises a relatively large friction drive wheel 21 similar to the friction drive wheel described in Prince et al. Patent 2,619,332, granted November 25, 1952, also assigned to the same assignee as the instant application.

As is fully disclosed in the copending Brown et al. application, there are supported from the spider 16 one or more mixing spindle assemblies 13. Actually, in Fig. 1 of the drawings, five such mixing spindle assemblies are illustrated, although more or less than this may be employed. Each spindle assembly 13 is supported individually from the spider 16 by a resilient hinge 22, whereby the spindle assemblies may pivot individually about the hinge 22 in a manner described in the Brown et al. application. Each spindle assembly comprises a mixing spindle 13a provided with suitable mixing elements such as 23 attached thereto, which spindle is mounted for rotation in a bearing support or housing 24 directly supported from the spider 16 by the hinge 22. Connected to the upper end of the spindle 13a and rotatable therewith is a friction wheel 25 which is capable of moving into driving engagement with the friction drive wheel 21.

For the purpose of selectively moving any one of the friction wheels 25 into driving engagement with the friction drive wheel 21, there is provided a toggle unit pivotally interconnecting the spindle housing 24 and the spider 16. As illustrated, the toggle unit comprises links 26 and 27 having a knee joint defined by the pivot pin 28 mounted for vertical movement. The link 26 is connected to the housing 24 by a pivot pin 29, while the link 27 is connected to an element 30 secured to the spider 16 by a pivot pin 31. It will be apparent, as viewed in Fig. 2 of the drawings, that upward movement of the pivot pin 28 defining the knee of the toggle joint will result in moving the friction wheel 25 towards the friction drive wheel 21. When the toggle is in a normal straight position, shown in Fig. 2 of the drawings, the fiction wheel 25 is spaced from the friction drive wheel 21, but when the knee of the toggle joint is displaced upwardly, the spindle assembly 13 pivots about the hinge 22, and the friction wheel 25 is moved into driving engagement with the friction drive wheel 21 in the manner fully described in the above-mentioned patent and copending application.

It has been found to be desirable to actuate a particular spindle assembly 13 and also to energize the motor 12 merely by movement of a mixing container, such as indicated at 32 in dotted lines in Fig. 2 of the drawings, into mixing position. Accordingly, there is provided for each spindle assembly 13 a plunger 33 mounted for vertical movement within an associated opening provided in the flange 16b of the spider 16 and having its upper end connected to pivot pin 28 by a lost motion connection comprising an elongated slot 33a. Each plunger 33 has a lower slot 33b designed to receive the rim of a cup such as 32. The plunger 33 is provided with a portion 33c of reduced cross section so as to define a shoulder 34 thereon. Resting on this shoulder is a lifter 35 which includes the necessary opening for the portion of reduced cross section 33c. The lifter is capable of being moved upwardly to engage a switch actuating lever 36 similar to that disclosed and claimed in the copending Brown et al. application referred to above. Suffice it to say that, whenever any plunger 33 is moved upwardly, the lever 36, which preferably extends around the spider 16 and is pivoted at 37, is raised to close a switch supplying current to motor 12. A coil spring 39 connected with the plunger 33 holds the lifter 35 on the shoulder 34. The elongated slot 33a provides a lost motion connection so that a predetermined upward movement of the plunger 33 can occur before the knee of the toggle unit is moved upwardly, thereby assuring actuation of the switch closing lever 36 to start the motor before friction wheel 25 is brought into driving engagement with friction drive wheel 21. The elongated slot providing a lost motion connection also accommodates slight variations in the over-all height of the mixing container or vessel such as 32. It will be a appreciated that the cooperating housing portions substantially enclose the motor 12, the spindle assemblies 13 except for the spindles 13a, and the driving means for the spindle assemblies.

To support the mixing container or vessel in mixing position relative to an associated spindle 13a and with the upper rim in engagement with the slot 33b of the plunger 33, there is provided for each spindle assembly an associated cup rest 40. In accordance with the present invention and unlike the cup rests of the Brown et al. application referred to above which were secured to the motor housing, the cup rests 40 of the present invention are movable and are supported on means protruding through associated openings 41 in the housing section 11b. It will be appreciated that movement of the cup rest 40 will cause movement of the mixing cup or container and more satisfactory mixing. To this end each cup rest 40 is secured to a mechanism for producing limited movement thereof. Each cup rest 40 is provided with a shallow recess or groove to receive therein the lower rim of a mixing cup or container such as 32.

In accordance with the present invention, there is provided a simple mechanism, generally designated at 42, for producing motion of the cup or container rest 40 during a drink mixing operation to insure more satisfactory mixing. This mechanism must be relatively light, since only a limited amount of weight may be attached to the end of a motor shaft 20 without deleterious effect on the motor. Also, the mechanism of the present invention should be capable of causing limited movement of all the cup rests simultaneously in the case of a mixer having a plurality of mixing spindles and associated cup rests.

Considering now specifically the mechanism 42 for supporting and causing movement of one or more cup rests such as 40, it comprises a supporting frame preferably formed of light material and comprising an upper frame member or plate 45 and a lower frame member or plate 46. These plates 45 and 46 are maintained in spaced parallel relationship by a plurality of dowels 47. Although the upper plate 45 is not shown in Fig. 6 of the drawings, its position is indicated by dashed lines in order to relate it to the dowels 47. For the purpose of holding the frame comprising plates 45 and 46 in assembled relationship, the lower plate is preferably provided with a plurality of tapped openings aligned with openings in the upper plate to receive the screws 48. As illustrated in the drawings, cylindrical spacers 49 surround the screws 48 between the plates 45 and 46 thereby providing a unitary frame structure.

The frame structure suitably supports a reduction gear mechanism as described in detail hereinafter. As illustrated, the upper plate 45 is provided with an opening to receive a bearing 50 for rotatably receiving therein the lower end 20b of the motor shaft. This bearing 50 may be of any suitable type and may, for example, comprise the well-known type known as Oilite bearings. To transmit rotary motion of the motor shaft 20 to the reduction gear mechanism, there is provided a combined gear and hollow stub shaft element 52 which performs a plurality of functions as will become apparent from the following description. This stub shaft element 52 has a central opening to receive the shaft end 20b and includes means to secure the same to such shaft end for rotation therewith. The element 52 further includes a cylindrical portion 52a at one end of which (the lower end as viewed in Fig. 3 of the drawings) there is provided an integral collar portion 52b whereby when element 52 is secured to the shaft end 20b it supports the frame structure described above and associated reduction gear mechanism thereon. The upper surface of the collar portion 52b is provided with a plurality of recesses surrounding the cylindrical portion, which recesses are filled with oil wicks indicated at 53 in Fig. 3 of the drawings.

For the purpose of converting rotary motion of the element 52, which is high speed rotation identical with that of the motor shaft 20, to a much lower speed of rotation, the element 52 is provided at the upper end of the cylindrical portion 52a with a spur gear 55 which may be formed integral with the element 52 or secured thereto by suitable means such as welding, brazing or the like. The spur gear 55 is in driving engagement with a large gear 56 which is part of an integral gear and pinion unit having a pinion 57 integrally united therewith. The gear 56 and pinion 57 are illustrated as two separate elements secured to a shaft 58 thereby providing an integral unit. The shaft 58 is journaled in bearings 60 and 61 disposed in aligned openings in plates 45 and 46, respectively. A suitable thrust washer 62 is interposed between the pinion 57 and the bearing 61. With this arrangement the gear and pinion unit 56—57—58 is rotatable in the space between plates 45 and 46 and driven by the spur gear 55.

The pinion 57 drives a gear 63 which is secured in any suitable manner to an eccentric member 65 having an eccentric portion 65b and a bushing portion 65a concentric with the stub shaft member 52. Interposed between the bushing portion 65a of the eccentric member 65 is a cylindrical bearing member 66. The cylindrical bushing portion 65a of the eccentric member 65 is rotatable within a suitable opening defined in bottom plate 46 and is rotatable at a relatively low speed in view of the reduction gear mechanism described above. For a particular embodiment constructed in accordance with the present invention, a gear reduction of forty-seven to one was obtained, so that the eccentric member 65 rotated at between thirty-five and forty revolutions per minute.

In order to secure the mechanism 42 to the portion 20b of the motor shaft, the latter is provided with flattened portion 20c engageable with a wedging member 69 secured to the collar portion 52b of the element 52. As shown in Fig. 7 of the drawings, the collar portion 52b is provided with a notch for receiving wedging member 69, which has an inclined surface 69a engageable with a cooperating angular surface 52c on element 52. As the wedging member 69 is secured to the collar portion 52b within the recess provided therefor by a screw 70, the wedging member 69 is moved into clamping engagement with the flat portion 20c of shaft 20. Preferably a set-screw 72 is provided in an extension of collar 52b to further insure that element 52 is firmly secured to shaft end 20b. To insure that the mechanism 42 is secured in the same position to shaft portion 20b, there is provided a positioning collar 73 surrounding shaft end 20b and interposed between motor 12 and bearing 50. This collar may have various thicknesses to insure correct positioning of the mechanism 42 relative to shaft end 20b.

It will be understood that rotation of the bushing portion 65a of eccentric 65 within the opening in lower plate 46 might tend to cause rotational movement of the frame comprising plates 45 and 46. To prevent this, the frame is secured to the back stand or column 10. This back stand has an opening therein to receive a portion of the gear 56, as is clearly shown in Fig. 2 of the drawings. A clip member 75 is secured as by fastening means 76 to the lower plate 46 and is provided with a pair of fingers for receiving therebetween the lower edge of the wall of the back stand 10 defining the opening for gear 56. Thus the frame for the reduction gear mechanism is held stationary while high speed rotation of shaft 20 is converted to low speed rotation of eccentric 65.

To convert rotary motion of eccentric 65 to movement of one or more cup rests 40, there is provided a cup rest moving member 78 provided with a circular opening therein to receive the eccentric portion 65b of eccentric 65. The cup rest moving member 78 is supported on collar portion 52b of stub shaft 52. Preferably a thrust bearing member 79 is interposed between collar portion 52b and cup rest moving member 78. The eccentric portion 65b includes recesses therein for retaining oil wicking or felt 77 to retain lubrication therein and insure proper lubrication at all times.

Only a single cup rest 40 is shown in Figs. 4 and 6 of the drawings and this cup rest is secured to the end of a lever 80 pivoted to a bifurcated member 81, as indicated at 82. Obviously, a plurality of cup rests could equally well be employed secured to member 78 in a similar manner. The member 81 is secured as by screw or fastening means 83 to the cup rest member 78. As illustrated, this cup rest moving member 78 has five spaced openings 84 to accommodate fastening means 83 for five cup rests 40. The cup rest 40 is secured by fastening means 85 to the end of lever 80 remote from pivot 82. As mentioned above, the housing portion 11b is provided with the plurality of openings 41 through which the ends of the levers 80 may protrude to support the cup rests 40 outside the housing 11b as shown. Secured to the upper and lower edges of the openings 41 are nylon rods 87 which may be provided with receses to receive the adjacent wall portions of the openings 41. These nylon rods guide the movement of the levers 80 and, hence, guide the movement of the cup rests 40.

For controlling the movement of the cup rest moving member 78, there is preferably provided a parallel linkage mechanism comprising parallel arms 89 and 90 having corresponding ends pivotally secured to plate 46 by fastening means 91 and 92, respectively. The other ends of parallel arms 89 and 90 are pivotally connected by a cross bar 93 and pivot means 94 and 95. The pivot means 94 and 95 preferably each comprise a bolt and nut, with the bolt having a shoulder portion slidable within cooperating slots 96 and 97 in cup rest moving member 78.

It will be understood that the rotary motion of eccentric 65 will cause cup rest moving member 78 to move through an arcuate path successively causing the different cup rest supporting levers 80 to describe a generally rotary somewhat reciprocating motion relative to their associated openings 41. Thus the cup rests 40 are moved at between thirty-five and forty cycles per minute to insure better mixing of the contents of the mixing cup 32.

In view of the detailed description included above, the operation of the present invention will readily be understood by those skilled in the art. The mechanism 42 is a subassembly which can readily be attached to the shaft 20 of the mixer motor. The mechanism 42 is simple and compact and can readily be attached to existing mixers.

While there has been illustrated and described a particular embodiment of the present invention, it will be understood that numerous changes and modifications may occur to those skilled in the art, and it is intended in the appended claims to cover all those changes and modifications as fall within the true spirit and scope of the present invention.

What is claimed as new and desired to be secured by Letters Patent of the United States is:

1. A drink mixer comprising a support, a mixer motor carried by said support, said motor including a rotatable shaft, a mixing spindle drivingly connected to said motor shaft, a cup rest for supporting a mixing container in position relative to said spindle during a mixing operation, and a mechanism drivingly connected to said motor for producing relative movement in a path transverse to the axis of said spindle between said mixing spindle and said cup rest during a drink mixing operation, said cup rest being supported solely by said mechanism.

2. A drink mixer comprising a support, a mixer motor carried by said support, said motor having a rotatable shaft, a mixing spindle drivingly connected to said motor shaft, a cup rest for supporting a mixing container in position relative to said spindle during a mixing operation, and a cup rest moving mechanism driven by said shaft for moving said cup rest in a plane transverse to said spindle, said cup rest being supported by said cup rest moving mechanism.

3. In a drink mixer, the combination of a support, a mixer motor carried by said support and including a motor shaft, a mixing spindle drivingly connected to said motor shaft, a cup rest for supporting a mixing container in position relative to said spindle during a mixing operation, and a cup rest moving mechanism supported from and driven by said shaft, said cup rest being supported on said cup rest moving mechanism.

4. The drink mixer of claim 3 in which said cup rest moving mechanism comprises a reduction gear mechanism.

5. The drink mixer of claim 3 in which said cup rest moving mechanism comprises a frame, a reduction gear mechanism supported on said frame, an eccentric assembly driven by said reduction gear mechanism and supported from said frame for developing arcuate movement, and means interconnecting said eccentric assembly and said cup rest for imparting to said cup rest said arcuate movement.

6. A drink mixer comprising a support, a mixer motor carried by said support including a shaft, a plurality of mixing spindles capable of being selectively drivingly connected to said motor shaft, a cup rest moving mechanism carried by and driven by said motor shaft for developing an arcuate movement, and a plurality of cup rests supported from said cup rest moving mechanism for engaging and supporting a plurality of mixing containers in mixing relationship with said spindles, said cup rest moving mechanism being capable of imparting said arcuate movement simultaneously to all of said plurality of cup rests and to mixing containers supported thereby.

7. A drink mixer comprising a base, a support mounted on said base, a mixer motor mounted on said support with its shaft in vertical position, a spindle driving mechanism driven by the upper end of said motor shaft, a mixing spindle depending from said support and drivingly engageable with said spindle driving mechanism, a cup rest moving mechanism carried by and driven by the lower end of said motor shaft for developing slow speed arcuate motion, and a cup rest supported by said cup rest moving mechanism for movement through an arcuate path.

8. The drink mixer of claim 3 wherein said motor and cup rest moving mechanism are enclosed by a housing, and an opening is defined in said housing through which said cup rest protrudes into operative relationship with said spindle.

9. The drink mixer of claim 3 wherein said cup rest is supported on a lever connected to said cup rest moving mechanism and said motor and mechanism are enclosed in a housing having an opening through which said lever moved by said mechanism protrudes to position said cup rest in operative relationship with said spindle, said spindle being disposed outside said housing.

10. For use with a drink mixer having a motor shaft, a cup rest moving mechanism comprising a frame including means for supporting the same from said motor shaft, a reduction gear mechanism supported by said frame and drivingly connected to said motor shaft, means driven by said reduction gear mechanism for producing agitatory motion, and a cup rest supported from said means responsive to said agitatory motion, said cup rest being capable of supporting a mixing container thereon.

11. The drink mixer of claim 3 wherein said frame is connected to said support to prevent rotation thereof.

12. The drink mixer of claim 9 in which the upper and lower edges of said opening are defined by plastic rods.

13. For use with a drink mixer having a motor shaft, a cup rest moving mechanism comprising an input shaft engageable with said motor shaft, a frame supported from said input shaft, a reduction gear mechanism carried by said frame and driven by said input shaft, an eccentric assembly carried by said frame including an eccentric driven by said reduction gear mechanism and an eccentric member cooperatively positioned relative to said eccentric to produce an agitatory movement, and a cup rest supported and driven by said eccentric assembly.

References Cited in the file of this patent
UNITED STATES PATENTS

| | | |
|---|---|---|
| 186,279 | Sisson | Jan. 16, 1877 |
| 1,578,143 | Leabo | Mar. 23, 1926 |
| 1,982,339 | Ehrenfeld | Nov. 27, 1934 |
| 2,218,808 | Brotheridge | Oct. 22, 1940 |